May 14, 1940. J. MONZROLL 2,200,398
TOOTHPICK DISPENSING DEVICE
Filed Oct. 21, 1938
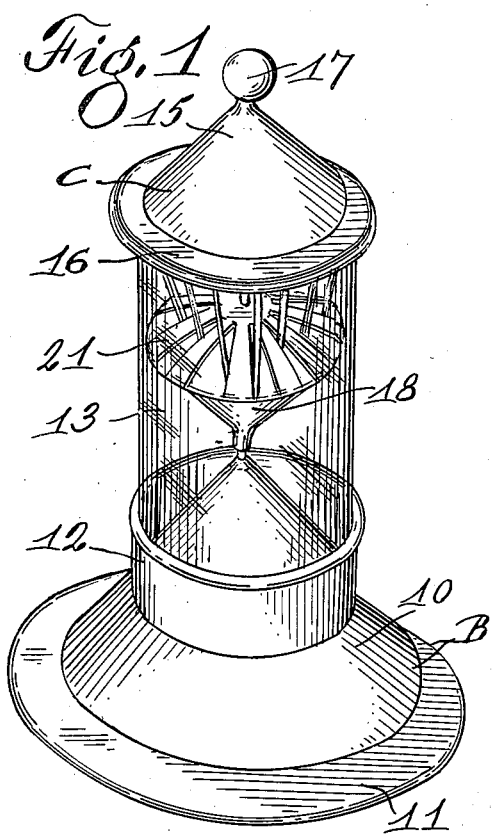
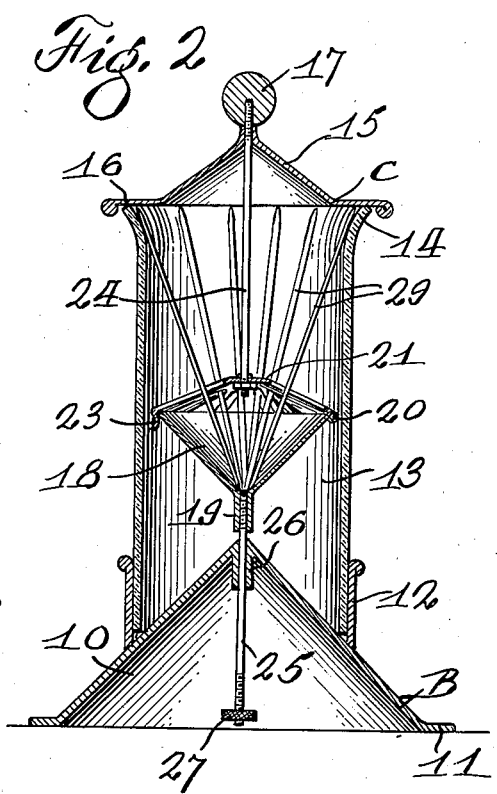
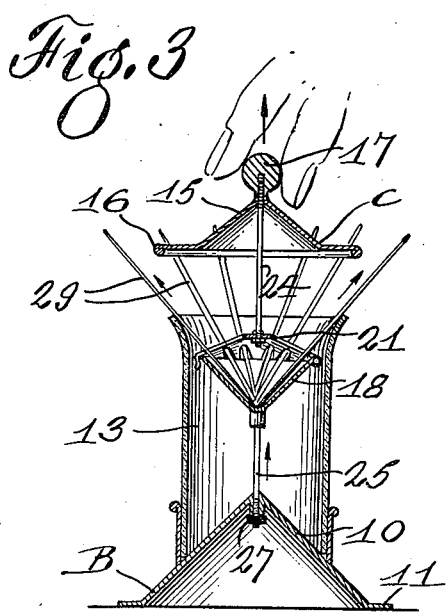
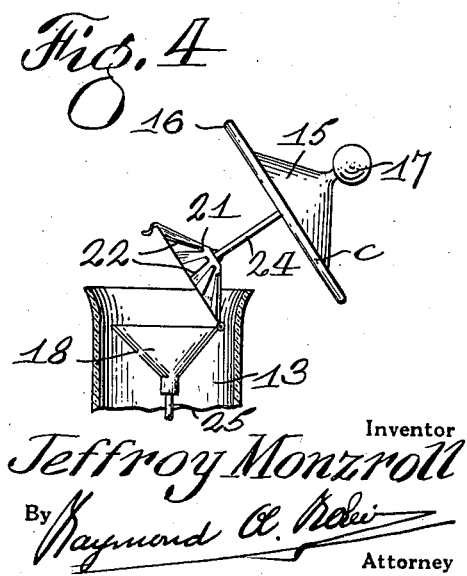
Inventor
Jeffroy Monzroll
By Raymond A. ....
Attorney Patented May 14, 1940

2,200,398

UNITED STATES PATENT OFFICE 2,200,398

TOOTHPICK DISPENSING DEVICE

Jeffroy Monzroll, Montreal, Quebec, Canada

Application October 21, 1938, Serial No. 236,315

2 Claims. (Cl. 312—78)

The present invention relates to improvements in toothpick dispensing devices.

An object of the invention is the provision of a toothpick dispensing device of generally improved design.

Another object of the invention is the provision of a toothpick dispensing device constructed so that the toothpicks are normally maintained in a sanitary covered condition.

A further object of the invention is to provide a toothpick dispensing device constructed so that the toothpicks may be easily disposed in projecting, readily removable dispensing positions.

Still another object of the invention is the provision of a dispensing device of the above character which is constructed so as to enable convenient cleaning to maintain the same in a sanitary condition.

A still further object of the invention is the provision of a dispensing device of the aforesaid character which is relatively simple and inexpensive in construction.

Other objects and advantages of the invention will become apparent as the description progresses.

In the accompanying drawing forming a part of this specification and in which like reference characters are employed to designate corresponding parts throughout the same:

Figure 1 is a perspective view of the device in closed position,

Figure 2 is a vertical section through the same,

Figure 3 is a similar view with the device disposed in open dispensing position, and Figure 4 is a fragmentary sectional view showing the manner of opening the tray top.

Referring to the drawing, wherein for the purpose of illustration is shown a preferred embodiment of the invention, B generally designates the base of the device embodying a conical centre portion 10 formed with a flat peripheral flange 11.

On the intermediate portion of the base cone 10 is secured an annular horizontally disposed ring 12 designed to receive therein the bottom portion of a cylindrical vertically arranged shell 13 preferably formed of transparent material such as a glass. At the top the shell 13 is formed with an outwardly flaring rim portion 14.

On the top edge of the chamber forming shell 13 is mounted a cover C embodying a conical centre portion 15 and a flat peripheral flange 16 and having formed on its apex a spherical knob 17.

Within the chamber formed by the cylindrical upstanding shell 13 is mounted a conical tray 18 formed with a depending centrally arranged socket 19. Connected to the edge of the tray 18 by a hinge connection 20 and disposed to normally assume a horizontal position thereon is a lid member 21 formed with a plurality of radial slots 22 and releasably secured on the horizontal tray 18 by a spring catch 23. To the centre portion of the tray lid 21 is secured the lower end of a vertically extending rod 24, having the lower end projecting through an aperture in the lid and secured by nuts while the upper end is firmly secured in the apex of the cover C. In the socket 19 of the tray is tightly secured the upper end of a bottom vertical rod 25 slidably mounted through a guide sleeve 26 in the centre of the conical base member and having a knurled nut 27 secured on the lower threaded end.

When in use, a plurality of toothpicks are inserted through the respective slots 22 of the lid member 21 so that their bottom end portions rest on the tray 18. When the device is in closed position the toothpicks, indicated at 29, assume upstanding nearly vertical positions with the upper end portions leaning against the flaring rim 14 of the chamber. For dispensing one or more of the toothpicks the cover C is raised by gripping the ball knob 17 thereupon and simultaneously raising the tray to a position in the upper part of the chamber, this movement being limited by the nut 27 on the bottom end of the rod 25. When the movable structure is thus elevated, the toothpicks will be guided to assume inclined radially spread positions with the top portions projecting laterally outward from the upper end of the chamber so as to enable convenient removal, as shown at Figure 3.

In order to clean the interior of the tray, so that the device may be maintained in a completely sanitary condition, the toothpicks are removed and the tray raised to its uppermost position and the rod 24 swung laterally through the medium of the cover, as shown at Figure 4, so as to swing the tray top to a raised position and permit convenient access to the interior of the tray.

It is to be understood that the form of my invention herein shown and described is to be taken as a preferred example of the same, and that various changes as to the shape, size and arrangement of parts may be resorted to without departing from the spirit of the invention or the scope of the subjoined claims.

Having thus described my invention, I claim:

1. A toothpick dispensing device comprising a conical base, an annular ring secured on the base, a cylindrical shell vertically supported in the ring and having the upper end open, a cover adapted to assume a closure position on the upper open end of the shell, a conical tray mounted for limited vertical sliding movement in the chamber of the shell and adapted to receive a number of toothpicks, a circumferentially slotted lid member on the tray for laterally separating the toothpicks in the tray, an element spacedly connecting the slotted lid and cover, and a pivoted connection between said lid and tray to facilitate cleaning of said tray, the said chamber and tray being so formed that toothpicks on the tray will assume approximately upstanding positions therein when the cover is closed and will be moved to laterally projecting positions at the top of the chamber when the cover and tray are elevated to dispensing positions.

2. In a toothpick dispensing device, a conical base apertured at the apex, a cylindrical shell supported vertically over the base and concentrically therewith, a sliding rod mounted vertically in the base aperture, a conical toothpick tray secured at the upper end of said rod, a stop at the lower end of the rod, a slotted lid hinged to the tray for keeping toothpicks in the tray separated laterally, a cover closing the upper end of the shell, and a member spacedly connecting the cover and lid, whereby elevating the cover will cause the toothpicks in the tray to project outwardly at the top of the shell in spaced positions within the slots of the lid.

JEFFROY MONZROLL.